United States Patent [19]

Holweg

[11] Patent Number: 4,986,799
[45] Date of Patent: Jan. 22, 1991

[54] TRANSMISSION CHAIN WITH PIVOT PINS AND INTERMEDIATE PIECES WITH ROLLING CONTACT ACTION

[75] Inventor: Hermanus A. C. Holweg, Rosmalen, Netherlands

[73] Assignee: Volvo Car B.V., Helmond, Netherlands

[21] Appl. No.: 417,519

[22] Filed: Oct. 5, 1989

[30] Foreign Application Priority Data

Oct. 7, 1988 [NL] Netherlands .......................... 8802468

[51] Int. Cl.⁵ .............................................. F16G 1/24
[52] U.S. Cl. ................................... 474/240; 474/217; 474/246
[58] Field of Search ............... 474/206, 212, 214, 215, 474/217, 219–221, 223, 227, 234, 229, 240, 242, 245, 246

[56] References Cited

U.S. PATENT DOCUMENTS

| | | | |
|---|---|---|---|
| 1,103,026 | 7/1914 | Bohlman | 474/242 |
| 3,043,154 | 9/1962 | Karig et al. | 474/229 |
| 4,543,081 | 9/1985 | Van Rooij et al. | 474/242 |
| 4,690,665 | 9/1987 | Oliver et al. | 474/245 |
| 4,738,654 | 4/1988 | Cole | 474/219 |

FOREIGN PATENT DOCUMENTS

| | | |
|---|---|---|
| 109780 | 5/1984 | European Pat. Off. . |
| 153453 | 9/1985 | Japan . |
| 060008 | 9/1982 | Netherlands . |
| 102673 | 3/1984 | Netherlands . |
| 275608 | 7/1988 | Netherlands . |

Primary Examiner—Ramon S. Britts
Assistant Examiner—Terry Lee Melius
Attorney, Agent, or Firm—Edmund M. Jaskiewicz

[57] ABSTRACT

Transmission chain for a cone pully drive, with intercoupled links and pivot pins inserted through link openings of which the end surfaces cooperate with the cone surfaces, where between each pivot pin, on the one hand, and the opposite opening sides of a number of adjacent links, on the other, an intermediate piece with rolling contact action is inserted with a coupling rib for coupling the intermediate piece to the link opening sides, and of which the opposite-lying longitudinal side forms the rolling surface cooperating with the longitudinal side of the pin, the end of each intermediate piece being provided with a recess at right angles to the longitudinal axis running between the longitudinal sides through the coupling rib and opening out into the end face.

6 Claims, 3 Drawing Sheets

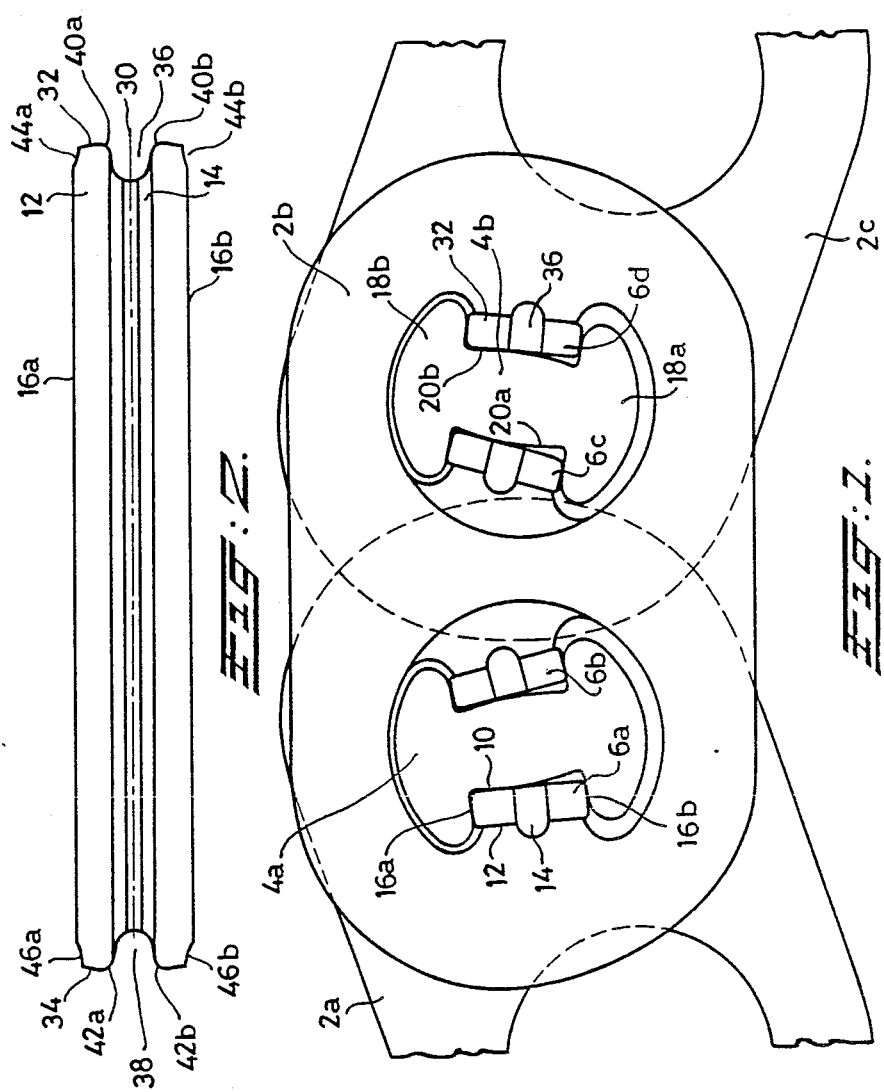

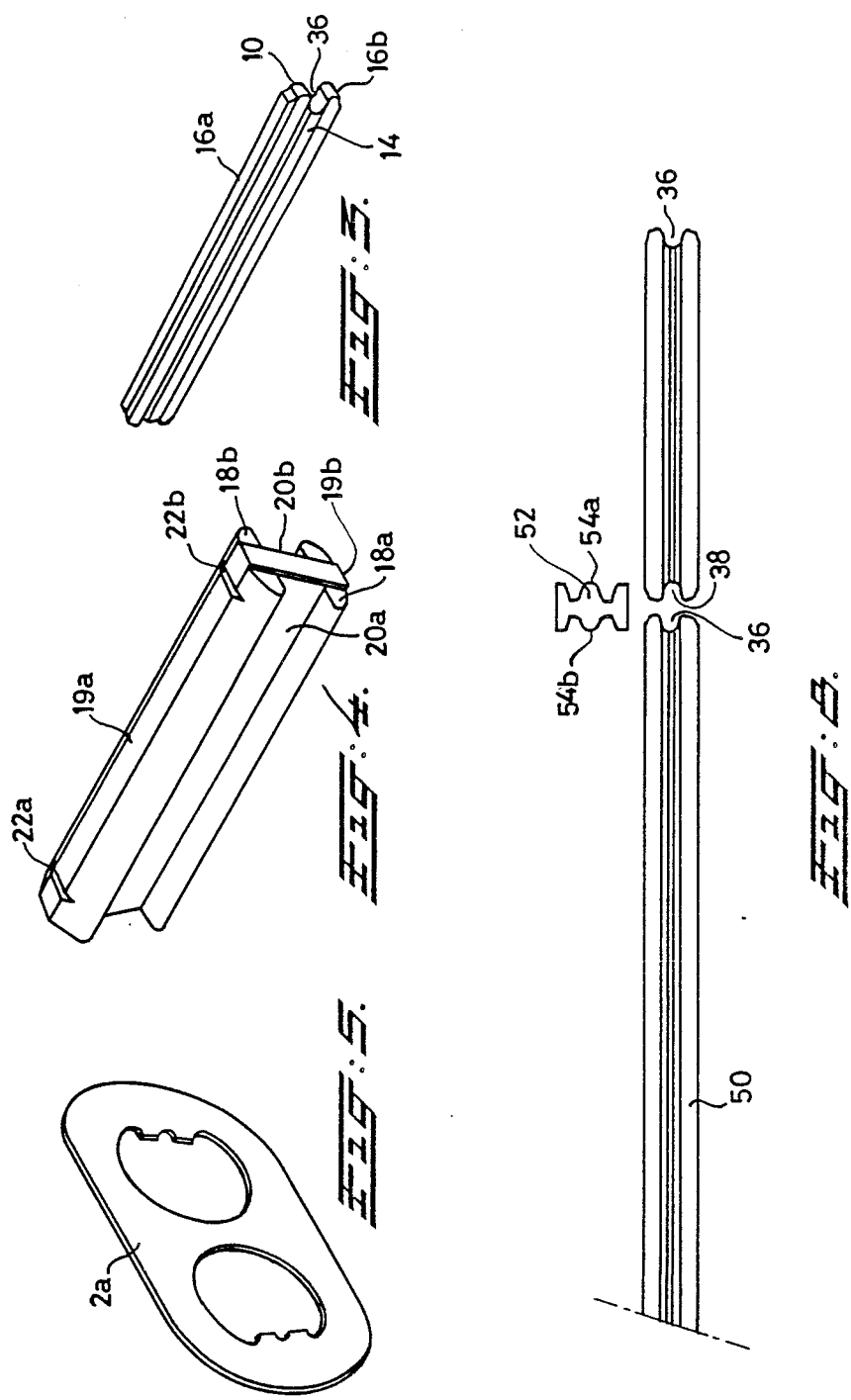

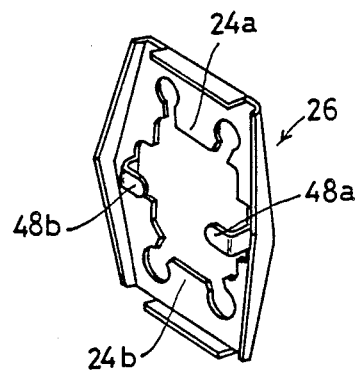
FIG:6.
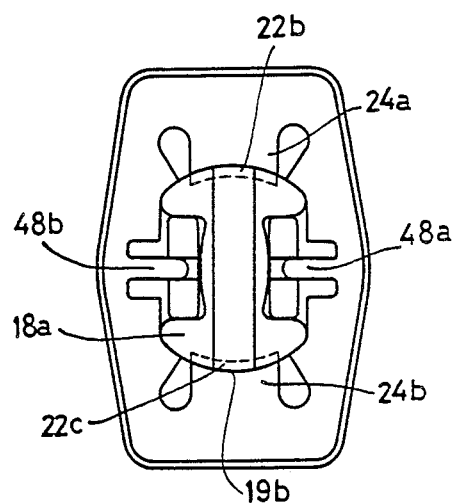
FIG:7.

TRANSMISSION CHAIN WITH PIVOT PINS AND INTERMEDIATE PIECES WITH ROLLING CONTACT ACTION

BACKGROUND OF THE INVENTION

The invention relates to a transmission chain for a cone pulley drive, comprising a number of intercoupled links each accommodating two pivot pins which lie at right angles to the link plane and are inserted through link openings, and the end surfaces of which cooperate as friction faces with the cone surfaces, and whose longitudinal sides form rolling surfaces with a radius of curvature different from same of the rolling surface cooperating therewith, and where provision is made between each pivot pin, on the one hand, and the opposite-lying upright opening sides of a number of adjacent links, on the other, for an intermediate piece with rolling contact action whose first longitudinal side bears a coupling ridge running in the lengthwise direction for coupling the intermediate piece to the link opening sides, and the oppposite-lying second longitudinal side forms the rolling surface cooperating with the longitudinal side of the pin.

DESCRIPTION OF THE PRIOR ART

Such a transmission chain is known from the European Patent Application Nos. 0 060 008 and 0 102 673.

For cheap manufacture of such a transmission chain (which is in particular intended for use in a continuously variable transmission) it is important to manufacture the many component parts as efficiently as possible, avoiding machine operations. The links can, of course, be manufactured by stamping out of sheet material, while the shaped pivot pins and intermediate pieces with rolling contact action can be made by a drawing a lengthwise section which is subsequently divided into discrete parts, following which the ends thereof are given the desired configuration by means of a machining operation. In the manufacture of intermediate pieces in particular problems occur because the coupling rib does not run over the entire length of the intermediate piece, but has to end shortly before the two end faces in order to obtain supporting surfaces for the locking plates which are to be fitted at both ends of each pivot pin, and which can, for example, have a configuration which is described in Dutch Patent Application No. 8700144 (not a prior publication) filed in the name of applicants. This removal of a part of the coupling ridge by means of a machining operation on a part which is already small per se is an operation which is difficult to carry out, and which in practice often leads to a surface which is machined entirely smooth. Besides, a machining operation is in principle more expensive than a die-stamping operation. It is also conceivable for the ride to be partially planed off in a die-stamping tool, but this gives rise to problems with the die-stamping tool, in view of the fact that the chips released are difficult to remove.

SUMMARY OF THE INVENTION

The object of the invention is to provide a configuration for the intermediate piece which not only makes it possible to manufacture the intermediate pieces without machining operation, but also improves the effect of locking plates of the kind as described above. To this end it is proposed that on each intermediate piece end a recess is formed, lying at right angles to the longitudinal axis running between the longitudinal sides through the coupling rib, and opening out into the end face. Preferably the recess is approximately semi-circular with a diameter equal to the width of the coupling rib and merging via roundings into the end face which is arched in longitudinal section.

In a preferred embodiment each end face merges via diverging transitions into the narrow longitudinal sides.

Preferably coupling rib, recess and transitions are in longitudinal section are symmetrical relative to the longitudinal axis of the intermediate piece.

The invention also proposes a process for the manufacture of an intermediate piece for use in a transmission chain as described above, according to which in a continuous drawing operating a section is made with a cross-section corresponding to that of the desired end-product, and this section is divided into discrete rolling intermediate pieces, each with the configuration as described above, by trimming with a cross-shaped die-stamping tool with suitable edge configuration.

The diverging transitions as described above make the assembly of the transmission chain considerably easier. During this assembly, after the fitting of the links round the pivot pins, the intermediate pieces are inserted between pivot pins and links and the diverging transitions present in the preferred embodiment thereby serve as a "locating edge" by means of which the assembly is speeded up considerably.

The process according to the invention makes it possible to manufacture the intermediate pieces without machining operation and thus results in a cheaper manufacture of the intermediate pieces.

DESCRIPTION OF THE DRAWINGS

FIG. 1 is an end view of a number of transmission chain links with their pivot pins and intermediate pieces designed according to the invention;

FIG. 2 is a side view of such an intermediate piece;

FIG. 3 is a perspective view of such an intermediate piece;

FIG. 4 is a perspective view of a pivot pin;

FIG. 5 is a perspective view of a link;

FIG. 6 is a perspective view of a locking plate used in such a transmission chain;

FIG. 7 is an end of a combination of a locking plate, pivot pin and intermediate pieces;

FIG. 8 is a top view of a longitudinal section from which discrete intermediate pieces are formed by using the process according to the invention.

The transmission chain according to the invention is of the kind described in the European Patent Application Nos. 0 060 008 and 0 102 673 which are included herin by reference; such a transmission chain is in particular intended for use in a continuously variable transmission with cone pulleys. In such a transmission chain one link always cooperates with two pins; each side face of each pin always cooperates with a rolling contact face of an intermediate piece which is placed between the pin in question and an upright limitation of the opening present in the link; when they run between the cone pulleys the pins are clamped between them and carried along. In such a transmission chain the torque is transmitted by tension.

FIG. 1 shows in end view a part of three links 2a–2c of a transmission chain with the pivot pins 4a–4b. The pin 4a cooperates with the links 2a, 2b, and the pin 4b with the links 2b, 2c. Each pin 4a, 4b cooperates with the appropriate links by means of two intermediate pieces for the pin 4a the intermediate pieces 6a, 6b, and for the pin 4b the intermediate pieces 6c, 6d. Each intermediate piece overlaps, as known per se, a number of links lying next to each other in the transverse direction of the chain. Each intermediate piece has a virtually flat longitudinal side 10 which forms the rolling surface with the pivot pin; the other longitudinal side 12 bears along part of its length a projecting rib 14. There are also two narrow longitudinal sides 16a, 16b.

Each pivot pin has, viewed in cross-section, two end faces 18a, 18b, in FIG. 1 shown for the pivot pin 4b and also shown in FIG. 4; the end faces merge into the longitudinal faces 20a, 20b which roll over the intermediate pieces. Such a configuration is also known from the state of the art.

In the two narrower longitudinal faces 19a, 19b a narrow groove is formed near the ends of pin, for the longitudinal face 19a indicated by the reference FIGS. 22a, 22b, and for the longitudinal face 19b indicated by 22c in FIG. 7. These grooves serve to take the end edges of the lips 24a, 24b of a locking plate 26 with a configuration which is the subject of Dutch Patent Application No. 8700144 (not a prior publication), filed in the name of Applicants and shown in FIG. 6.

The present invention relates in particular to the shaping of the ends of the intermediate pieces used in the transmission chain.

As can be seen from FIGS. 2 and 3, in combination with the end view of the intermediate pieces according to FIG. 1, a recess 36, 38 is formed in each intermediate piece, lying at right angles to the longitudinal axis 30 thereof, running between the two longitudinal sides 10 and 12 thereof, and opening out into the end face 32, 34. This recess in the embodiment shown is essentially semi-circular in longitudinal section, with a diameter equal to the width of the coupling ridge 14, and each recess merges via roundings 40a, 40b and 42a, 42b into the appropriate end face 32, 34. As FIG. 2 shows, the configuration is symmetrical relative to the longitudinal axis 30.

The figures also show how the end faces 32, 34 do not merge directly into the narrow longitudinal sides 16a, 16b, but via filets 44a, 44b and 46a, 46b, which is an advantage in the assembly of a transmission chain which is provided with the intermediate pieces according to the invention: the fillets 44a, 44b and 46a, 46b act as locating edges which facilitate the insertion of the intermediate pieces between the pivot pins and the links mating therewith.

The configuration according to the invention has the advantage that the locking lips 48a, 48b disposed on the locking plate 26, which in a locking plate with a configuration described in the above-mentioned Dutch Patent Application No. 8700144 (not a prior publication) can extend only to the longitudinal side of the intermediate piece, can now extend much further, as can be seen clearly from FIG. 7. This achieves a more secure locking of the intermediate pieces and the links between the two locking plates disposed on a pivot pin.

An important aspect of the invention is the way in which the intermediate pieces are manufactured. This manufacture takes place according to the invention by cold drawing of a longitudinal section with a cross-section configuration corresponding to the intermediate pieces finally to be obtained an by trimming this section to the desired length by means of a cross-shaped die-stamping tool whose external contours correspond to those of two recesses and end face configurations lying opposite each other. FIG. 8 shows a longitudinal section 50 in side view and an end view of the cross-shaped trimming tool 52 which is used for trimming the section 50. The external contours 54a, 54b correspond to the contour of the left and right end faces respectively of the intermediate piece in FIG. 2, and the trimming movement takes place at right angles to the plane of the drawing. The end faces with recesses of two intermediate pieces are thus always formed in a single operation. The machining operation necessary for the known intermediate pieces is dispensed with, with all the advantages this entails.

What is claimed is:

1. A transmission chain for a cone pulley drive comprising a plurality of intercoupled links (2a .. 2c) each having two openings therein and each said opening having an edge surface, two pivot pins (4a, 4b) disposed through said openings respectively of a link at right angles to the plane of the link, each said pivot pin having end faces (18a, 18b) which cooperate as friction surfaces with cone surfaces of cone pulleys, each said pivot pin having opposed longitudinal sides (20a, 21b) and each said longitudinal side having a radius of curvature, a plurality of intermediate pieces (6a ... 6d) and a said intermediate piece disposed between each pivot pin and a link opening edge surface opposed from said pivot pin such that each said intermediate piece has rolling contact action with a said longitudinal side of a said pivot pin, each said intermediate piece having opposed ends (32,34) and there being a first longitudinal side (12) and an opposed second longitudinal side (10) extending between said ends, there being a central longitudinally extending rib (14) on said first longitudinal side to couple said intermediate piece to the link opening edge surface, said rib extending longitudinally from one of said opposed ends to the other, there being a recess (36,38) in each of said ends of a said intermediate piece disposed at right angles to a central longitudinal axis (30) of said intermediate piece, each said recess extending between said first and second longitudinal sides and through said rib.

2. A transmission chain according to claim 1 in which the recess (36,38) is approximately semi-circular with a diameter equal to the width of the rib (14).

3. A transmission chain according to claim 1 wherein each said recess has its edges rounded into the respective end surfaces.

4. A transmission chain according to claim 1 wherein said end surfaces are arched in longitudinal sections.

5. A transmission chain according to claim 1 wherein each said intermediate piece has opposed third and fourth longitudinal sides between said first and second longitudinal sides, said third and fourth longitudinal sides being narrower than said first and second longitudinal sides, there being concave transition surfaces between each said end and said third and fourth narrow longitudinal sides.

6. A transmission chain according to claim 5 wherein said coupling rib, said end recesses and the rounded edges of said recesses are symmetrical with respect to a plane passing through said central longitudinal axis and parallel to said third and fourth narrow longitudinal sides.

* * * * *